(12) United States Patent
Kobune et al.

(10) Patent No.: US 10,195,774 B2
(45) Date of Patent: Feb. 5, 2019

(54) RESIN CAST DEVICE AND RESIN CAST METHOD

(71) Applicant: CALSONIC KANSEI CORPORATION, Saitama (JP)

(72) Inventors: Yoshihito Kobune, Saitama (JP); Akihito Kanemasa, Saitama (JP); Kenjiro Sugimoto, Saitama (JP); Kunio Shimada, Saitama (JP)

(73) Assignee: CALSONIC KANSEI CORPORATION, Saitama (JP)

( * ) Notice: Subject to any disclaimer, the term of this patent is extended or adjusted under 35 U.S.C. 154(b) by 907 days.

(21) Appl. No.: 14/409,125

(22) PCT Filed: Jun. 6, 2013

(86) PCT No.: PCT/JP2013/065744
§ 371 (c)(1),
(2) Date: Dec. 18, 2014

(87) PCT Pub. No.: WO2013/191008
PCT Pub. Date: Dec. 27, 2013

(65) Prior Publication Data
US 2015/0190956 A1 Jul. 9, 2015

(30) Foreign Application Priority Data

Jun. 20, 2012 (JP) .................................. 2012-138944

(51) Int. Cl.
*B29C 45/43* (2006.01)
*B29C 33/46* (2006.01)
*B29C 33/44* (2006.01)
*B29C 45/76* (2006.01)
*B29C 45/80* (2006.01)
(Continued)

(52) U.S. Cl.
CPC ............ *B29C 45/43* (2013.01); *B29C 33/442* (2013.01); *B29C 33/46* (2013.01); *B29C 45/768* (2013.01);
(Continued)

(58) Field of Classification Search
CPC ....... B29C 33/44; B29C 33/442; B29C 33/46; B29C 45/43; B29C 45/435; B29C 45/82;
(Continued)

(56) References Cited

U.S. PATENT DOCUMENTS 3,008,181 A * 11/1961 Fitz ...................... B29C 43/085
264/160
3,183,292 A * 5/1965 Dvoracek ............. B29C 45/261
249/66.1
(Continued)

FOREIGN PATENT DOCUMENTS

CN 1473696 2/2004
CN 201268078 7/2009
(Continued)

OTHER PUBLICATIONS

International Search Report (ISR) dated Sep. 10, 2013 in International (PCT) Application No. PCT/JP2013/065744.

*Primary Examiner* — Atul P. Khare
(74) *Attorney, Agent, or Firm* — Wenderoth, Lind & Ponack, L.L.P.

(57) ABSTRACT

An air ejector of a resin molding device includes air passages, air outlets through which air is injected, movable valves biased by bias members to close the air outlets, accommodation spaces in which the movable valves are movably contained, an air supply path through which air is supplied from an air supply source, and a pressure sensor to detect air pressure. After completing the mold removal, the air is supplied via the air supply path to the air passages at an air pressure smaller than the bias force of the bias members, and the air pressure is detected by the pressure sensor.

3 Claims, 10 Drawing Sheets

(51) Int. Cl.
*B29C 45/84* (2006.01)
*B60R 21/045* (2006.01)
*B29C 45/40* (2006.01)
*B29C 45/82* (2006.01)

(52) U.S. Cl.
CPC .......... *B29C 45/7626* (2013.01); *B29C 45/80* (2013.01); *B29C 45/84* (2013.01); *B29C 45/401* (2013.01); *B29C 2045/822* (2013.01); *B29C 2945/76167* (2013.01)

(58) Field of Classification Search
CPC ... B29C 45/768; B29C 45/7626; B29C 45/40; B29C 45/4005; B29C 45/401; B29C 45/4015; B29C 45/4094; B29C 2045/822
USPC ........................................................ 264/335
See application file for complete search history.

(56) References Cited

U.S. PATENT DOCUMENTS

| | | | | |
|---|---|---|---|---|
| 4,364,895 A | * | 12/1982 | Underwood | B29C 45/43 249/66.1 |
| 4,438,065 A | * | 3/1984 | Brown | B29C 45/43 264/335 |
| 4,521,367 A | * | 6/1985 | Underwood | B29C 45/43 264/318 |
| 4,580,965 A | | 4/1986 | Wernecke | |
| 4,981,430 A | * | 1/1991 | Zimmerman, Jr. | B29C 45/4005 249/67 |
| 5,273,707 A | * | 12/1993 | Carroll | B29C 45/1734 264/328.12 |
| 5,368,468 A | * | 11/1994 | Boskovic | B29C 45/4005 264/335 |

FOREIGN PATENT DOCUMENTS

| | | | |
|---|---|---|---|
| JP | 50-30951 | | 3/1975 |
| JP | 5-131257 | | 5/1993 |
| JP | 6-63962 | | 3/1994 |
| JP | 9-254188 | | 9/1997 |
| JP | 2001-9880 | | 1/2001 |
| JP | 2002-172456 | | 6/2002 |
| JP | 2007-125789 | | 5/2007 |
| JP | 2007125789 A | * | 5/2007 |
| JP | 2010-208165 | | 9/2010 |
| WO | 90/06220 | | 6/1990 |

\* cited by examiner

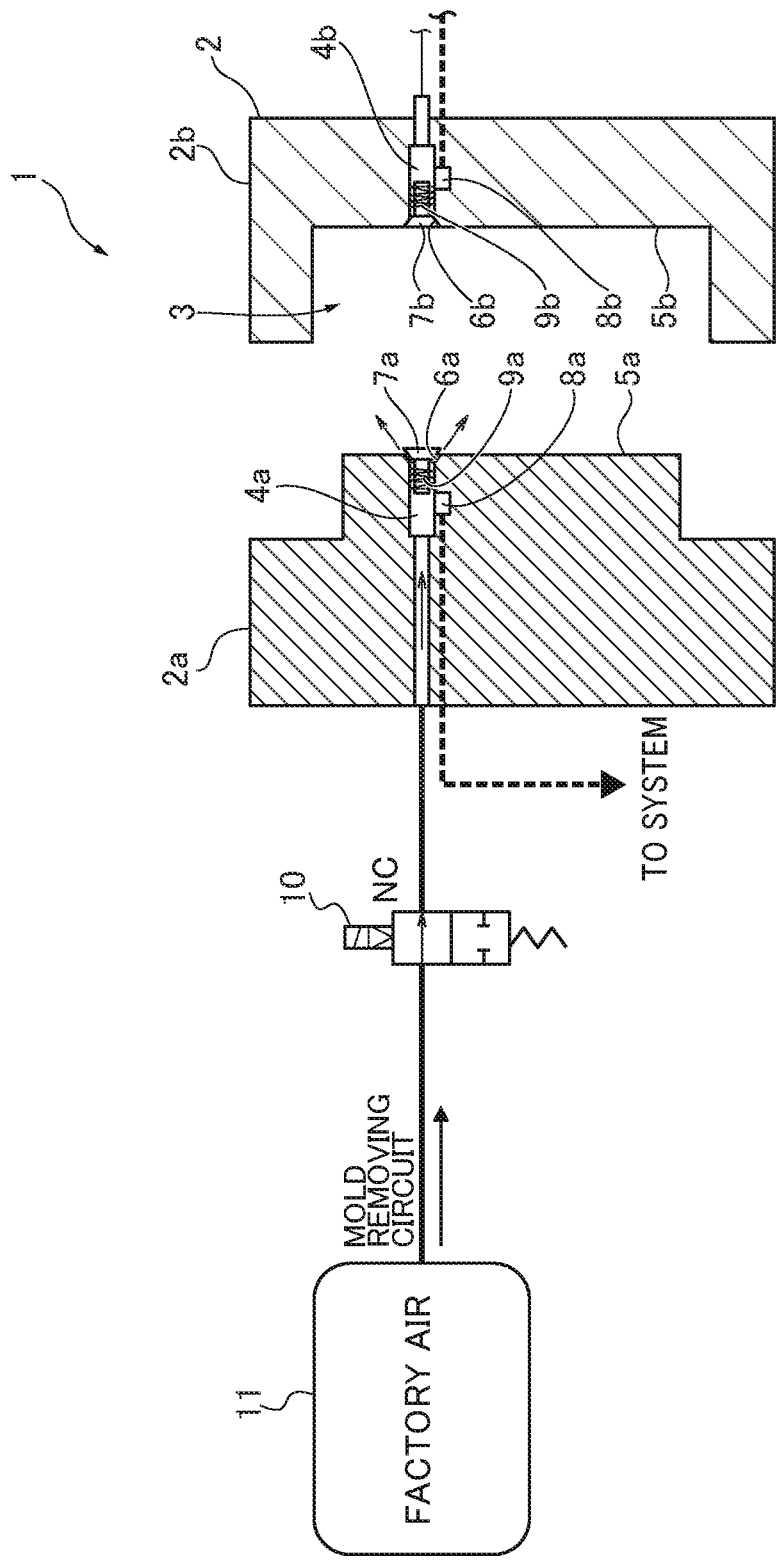
FIG. 9 - PRIOR ART

FIG.10A - PRIOR ART
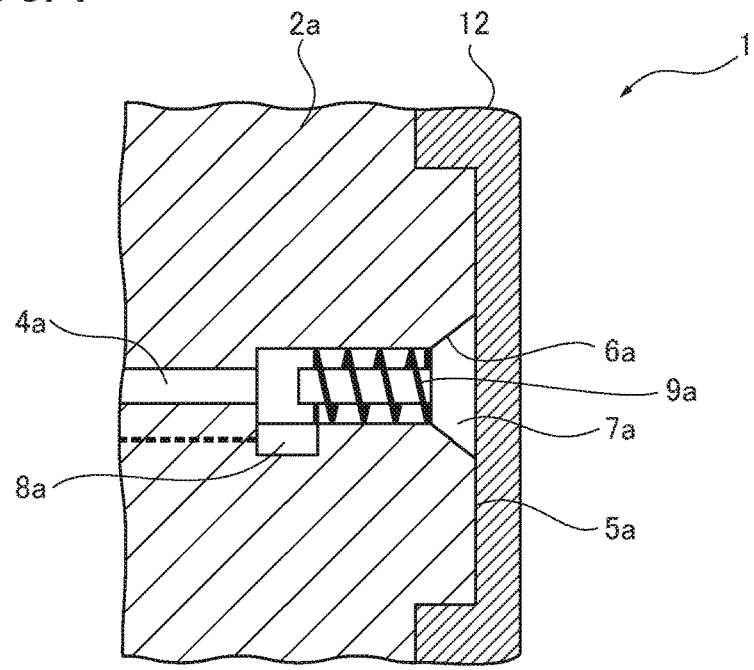
FIG.10B - PRIOR ART
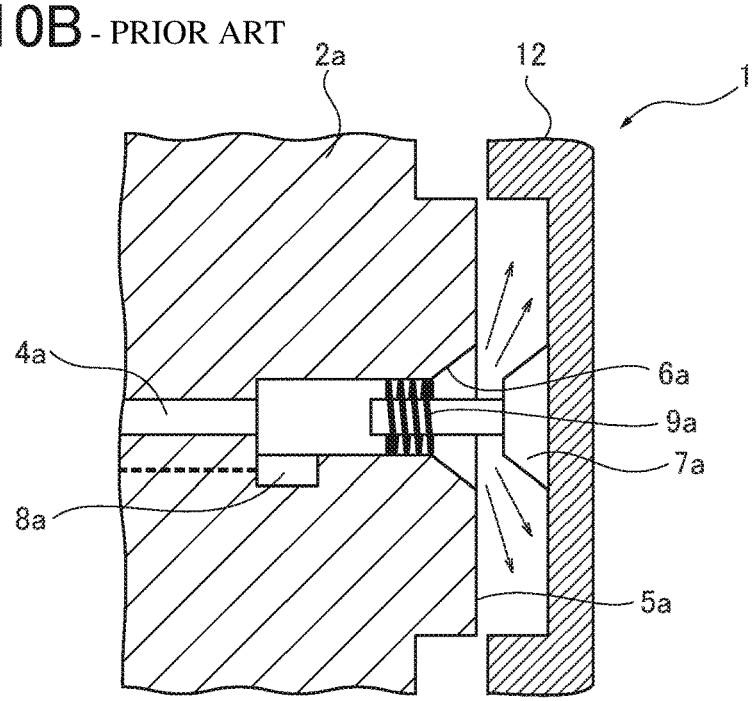

FIG.11A - PRIOR ART
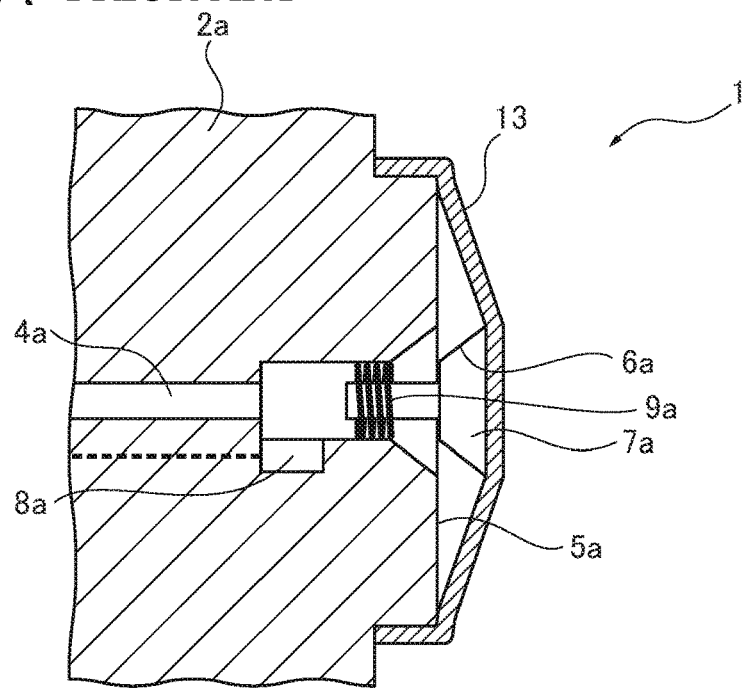
FIG.11B - PRIOR ART
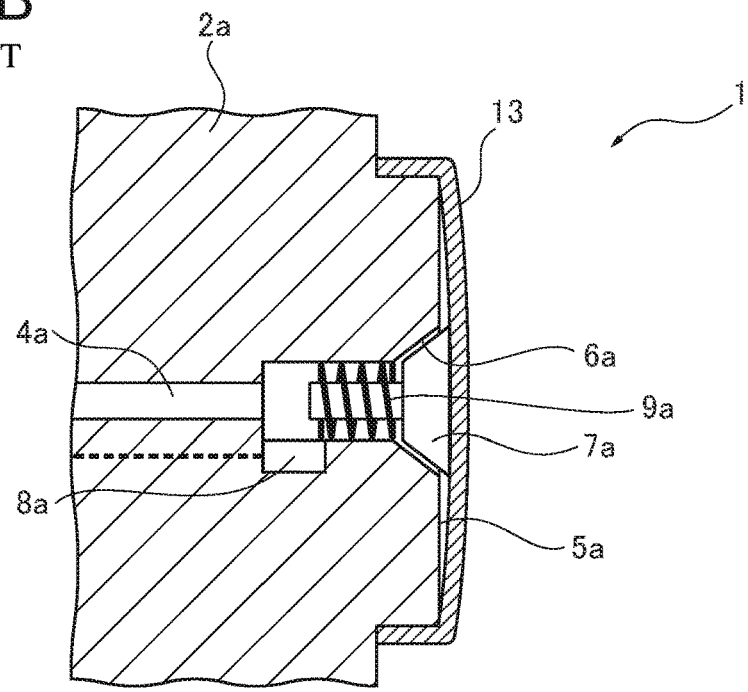

RESIN CAST DEVICE AND RESIN CAST METHOD

TECHNICAL FIELD

The present invention relates to resin molding device and method and particularly relates to resin molding device and method suitable for forming thin and soft resin molded products.

BACKGROUND ART

As a resin molding device, an injection molding device has been widely known and popular in general. A technique to remove a resin molded product created by an injection molding device from a mold with an air ejector (see Japanese Patent Laid-Open Application Publication No. 2001-9880, for example) is also well known. After injection molding, a resin molded product is tightly attached in a vacuum state to the surface of the mold by the pressure applied by the injection molding. The vacuum state between the mold and the resin molded product is released by air injected from the air ejector to thereby remove the resin molded product from the mold.

There is an air ejector comprising a movable valve (rod) accommodated in an air passage. The movable valve moves forward and backward in a direction of air injection to open and close an air outlet from which air blows. The movable valve is generally biased by a bias member such as a spring to be accommodated in the air passage to close the air outlet. When air is supplied to the air passage, the movable valve is moved to protrude from the air outlet, thereby opening the air outlet. Also, the movable valve protrudes from the air outlet to a molding space along with the injected air to push out the resin molded product. To remove the resin molded product from a mold, the movable valve is moved towards the resin molded product by pressure of the air supplied in the air passage to open the air outlet. Thereby, the vacuum state between the resin molded product and the surface of the mold is released by the air injection from the air outlet and the resin molded product is pushed out by the protrusion of the movable valve from the air outlet and separated from the mold. When the air supply is stopped, the movable valve is returned to the initial position by the bias force of the bias member to close the air outlet. Then, the injection molding of the resin molded product and the removal of the mold continue.

However, a problem may arise that when the air supply is stopped, the movable valve becomes stuck and is not returned to the initial position for some reason such as an operation failure of the bias member. Such a returning failure of the movable valve may cause a breakage of the mold or the movable valve when the mold is clamped next. Further, melted resin may enter the air passage from the air outlet, causing the operation failure or breakage of the air ejector. Therefore, it is required to develop a resin molding device and method to be able to quickly and surely detect the operation failure of the air ejector and promptly recover the air ejector to be in a normal state.

SUMMARY OF THE INVENTION

In view of the above, the present invention aims to provide a resin molding device and method which can easily detect the operation failure of an air ejector and improve the quality of a resin molded product.

A resin molding device according to the present embodiment comprises a mold including a molding space in which a thin and soft resin molded product is formed by injection molding and comprising a concave mold and a convex mold. An air ejector is provided to remove, by air injection, the resin molded product formed in the molding space from a molding surface of the mold. The air ejector includes an air passage formed inside at least one of the concave mold and convex mold of the mold, an air outlet opened to a molding-space side of the air passage to inject air between the resin molded product formed in the molding space and the molding surface, a movable valve movably accommodated inside the air passage and biased by a bias member in a direction in which the air outlet is closed, an air supply path through which the air is supplied from an air supply source to the air passage, and an air pressure detector provided on the air supply path to detect a pressure of the air. When removing the resin molded product from the molding space, the air is supplied to the air passage via the air supply path at an air pressure larger than a bias force of the bias member to move the movable valve so that the movable valve protrudes from the air outlet and open the air outlet. After removing the resin molded product, the air is supplied to the air passage via the air supply path at an air pressure smaller than the bias force of the bias member and the air pressure is detected by the air pressure detector.

A resin molding method according to the present invention comprises a forming process of injection-molding a resin molded product by injecting melted resin into a molding space of a mold comprising a concave mold and a convex mold, a mold removing process of injecting air between a molding surface of the mold and the resin molded product with an air ejector to remove the resin molded product from the mold, and an operation state detecting process of detecting an operation state of the air ejector. The mold removing process includes supplying air to an air passage provided in at least one of the concave mold and the convex mold of the mold at an air pressure larger than a bias force of a bias member which biases a movable member movably accommodated in the air passage to close an air outlet, moving the movable valve to protrude from the air outlet to open the air outlet, and injecting the air between the resin molded product and the molding surface to remove the resin molded product from the mold. The operation state detecting process includes supplying the air from an air supply source to the air passage via an air supply path at an air pressure smaller than the bias force of the bias member and detecting a change in the air pressure of the air supply path by an air pressure detector provided on the air supply path.

Advantageous Effects of the Invention

According to the present invention, the device is able to easily, accurately sense normalcy or anomaly of the operation state of the air ejector only by detecting a change in the air pressure, and realize a resin molding device and a resin molding method which can enhance the quality of resin molded products. Thus, it is able to properly prevent creases, deflection, breakage, and the like of a thin and soft resin molded product and efficiently obtain a high quality resin product. Further, the device is able to appropriately prevent an operation failure or a breakage of the resin molding device and improve the durability of the resin molding device.

BRIEF DESCRIPTION OF THE DRAWINGS

FIG. 9 is a schematic side section view of a typical injection molding device for thick and hard resin molded products.

FIG. 10A is a schematic enlarged view of the vicinity of an air outlet of an injection molding device in FIG. 9 before removing a mold from a thick and hard resin molded product in mold removing process.

FIG. 10B is a schematic enlarged view of the vicinity of the air outlet of the injection molding device in FIG. 9 when removing a mold from the thick and hard resin molded product in the mold removing process.

FIG. 11A schematically shows that a thin and soft resin molded product injection-molded by the injection molding device in FIG. 9 is removed from the mold and a movable valve is protruded at a conventional length.

FIG. 11B schematically shows that a thin and soft resin molded product injection-molded by the injection molding device in FIG. 9 is removed from the mold and the movable valve is protruded at a reduced length.

DETAILED DESCRIPTION OF THE INVENTION

Figure 1:
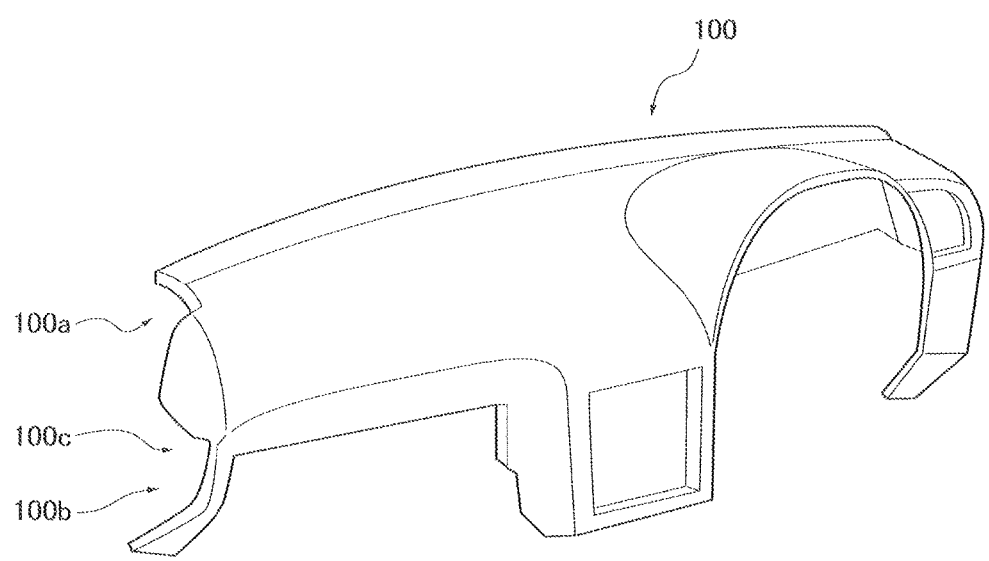
FIG. 1 is a perspective view of an instrument panel.

Hereinafter, referring to FIG. 9 and FIGS. 10A to 10B, a description is made of a mold removing process for a thick and hard resin molded product by an injection molding device 1 as an example of a typical resin molding device having an air ejector. The injection molding device 1 in FIG. 9 is intended for forming a thick and hard resin molded product by injection molding, and comprises a mold 2 having a convex mold portion 2a and a concave mold portion 2b. With the convex mold portion 2a and concave mold portion 2b closed (mold-clamped), a molding space 3 in which the resin molded product is molded is formed in the mold. A thick and hard resin molded product is injection-molded by injecting a melted resin material into the molding space 3 and solidifying the resin material.

Next, the air ejector is described. Air passages 4a, 4b through which air is supplied are formed inside the convex mold 2a and concave mold 2b. Air outlets 6a, 6b are opened to molding surfaces 5a, 5b of the convex mold 2a and concave mold 2b to inject the air supplied from the air passages 4a, 4b to the molding space 3. Further, columnar spaces in a larger diameter than that of the air passages 4a, 4b are formed on the side of the air outlets 6a, 6b of the air passages 4a, 4b to accommodate movable valves 7a, 7b. The movable valves 7a, 7b are movable forward and backward inside the columnar spaces. Return sensors 8a, 8b are provided, facing the movable valves 7a, 7b, to sense the positions of the movable valves 7a, 7b and detect their returning states. Magnet sensors or the like are generally used for the return sensors 8a, 8b. The movable valves 7a, 7b are biased by pressing springs 9a, 9b in a direction to close the valves. The air passages 4a, 4b are connected to an air supply source 11 such as factory air via air supply paths. The air supply to the air passages 4a, 4b is controlled by an on-off valve 10.

A process in which a thick and hard resin molded product is removed from the convex mold 2a with such an injection molding device 1 is described referring to FIGS. 9, 10A and 10B, for example. In FIG. 10A, an injection-molded thick and hard resin molded product 12 is tightly attached in a vacuum state to the molding surface 5a of the convex mold 2a and the movable valve 7a is contained in the air passage 4a with the air outlet 6a closed. The rear end of the movable valve 7a is positioned in a detection range of the return sensor 8a so that the sensor 8a detects presence of the movable valve 7a.

Then, when the on-off valve 10 in FIG. 9 is opened, air is supplied from the air supply source 11 to the air passage 4a. The movable valve 7a is pressed by the air pressure toward the molding space 3 against a bias force of the pressing spring 9a and strongly hits the thick and hard resin molded product 12 and receives the air pressure. The air pressure and the hitting strength of the movable valve 7a are adjusted not to damage or deform the thick and hard resin molded product 12. The air pressure moves the movable valve 7a to protrude from the air outlet 6a, further press the thick and hard resin molded product 12 and open the air outlet 6a. Thereby, the air is injected between the thick and hard resin molded product 12 and the molding surface 5a. Thus, while the vacuum contact state therebetween is gradually released, the thick and hard resin molded product 12 is pulled by a molded-product fetching machine, and the thick and hard resin molded product 12 is separated from the molding surface 5a by a reactive force of the product 12 against the pressing force. Now, the mold removal is completed.

After the removal of the thick and hard resin molded product 12 from the mold, the on-off valve 10 is closed to stop the air supply from air supply source 11 to the air passage 4a. At the stop of the air supply, the movable valve 7a is returned to the initial position by the bias force of the pressing spring 9a to close the air outlet 6a. The return sensor 8a senses the return of the movable valve 7a. Thereby, a series of injection molding process is determined to be normally completed and injection molding of a next resin molded product is performed.

However, because of an operation failure of the pressing spring 9a or the like, the movable valve 7a may not be returned to the initial position. In this case, the air outlet 6a remains opened. When the mold is clamped, therefore, the outwardly protruding movable valve 7a may hit the mold 2 and break it. Moreover, when melted resin is injected into the molding space 3 with the air outlet 6a opened, the melted resin flows into the air passage 4a from the air outlet 6a and fixates the movable valve 7a, making it impossible the movable valve 7a to operate and resulting in an operation failure.

To prevent such a failure from occurring, the injection molding device 1 performs the following control. If the return sensor 8a does not sense the return of the movable valve 7a, it notifies an error to a system side (control side). Upon receiving the error notice, the system side stops the operation of the injection molding device 1, and returns the movable valve 7a to the correct position and then resumes the operation of the injection molding device 1. Thus, the return sensor 8a monitors the operation of the movable valve 7a to be able to detect an operation failure. Thereby, the injection molding device 1 can properly mold the resin molded product.

Before inventing the present application, the inventors injection-molded a thin and soft surface material used for an internal panel in a front compartment of a vehicle such as an automobile using a general injection molding device 1 as described above. An internal panel provided in the front compartment is called an instrument panel or dashboard. There is such an internal panel including a multi-layer structure comprised of a hard core, a cushion layer and a thin and soft surface material such that the cushion layer and surface material are laminated on the surface of the hard core. Such a thin and soft surface material is typically manufactured by powder slush molding or vacuum molding. However, a powder slush molding device and a vacuum molding device have not widely used nationwide and only used in limited factories and regions. In view of this, the inventors tested injection molding of a surface material using a widely popular injection molding device.

As described above, the thick and hard resin molded product has a hardness not to be easily damaged or deformed, upon receiving a strong pressure from the movable valve when removing the mold. However, a resin product such as the surface material is thin and soft and higher in temperature than normal temperatures immediately after the injection molding. Because of this, it is extremely soft and fragile and tightly attached on the molding surface. Therefore, when the movable valve 7a is protruded at a normal length (stroke), that is, about 3.0 mm as shown in FIG. 11A, a large load is applied only on a contact face with the movable valve 7a. This causes a part of a thin and soft resin product 13 to be extended and solidified, which leads to creases or distortions in a finished product.

In view of the above, the inventors attempted to prevent an extension of the thin and soft resin molded product 13 by shortening a moving stroke of the movable valve 7a of the thin and soft resin molded product 13, as shown in FIG. 11B. Specifically, the stroke of the movable valve 7 was set to 2 mm or less which is approximately equal to the thickness of the thin and soft resin molded product 13. It was found that by moving the movable valve 7a at such a minute stroke, it is possible to inject air onto the thin and soft resin molded product 13 slightly floated from the molding surface 5a without causing an unexpected extension thereof, and easily remove the resin molded product 13 from the mold.

However, sensors including a magnet sensor are intended for sensing a distance between objects and positions thereof, and the a sensor capable of sensing a returning failure of a moving object at a minute stroke such as the above movable valve has not been developed. Therefore, the inventors then focused on a change in the air pressure to operate the movable valve and developed the present application.

First Embodiment

Figure 2:
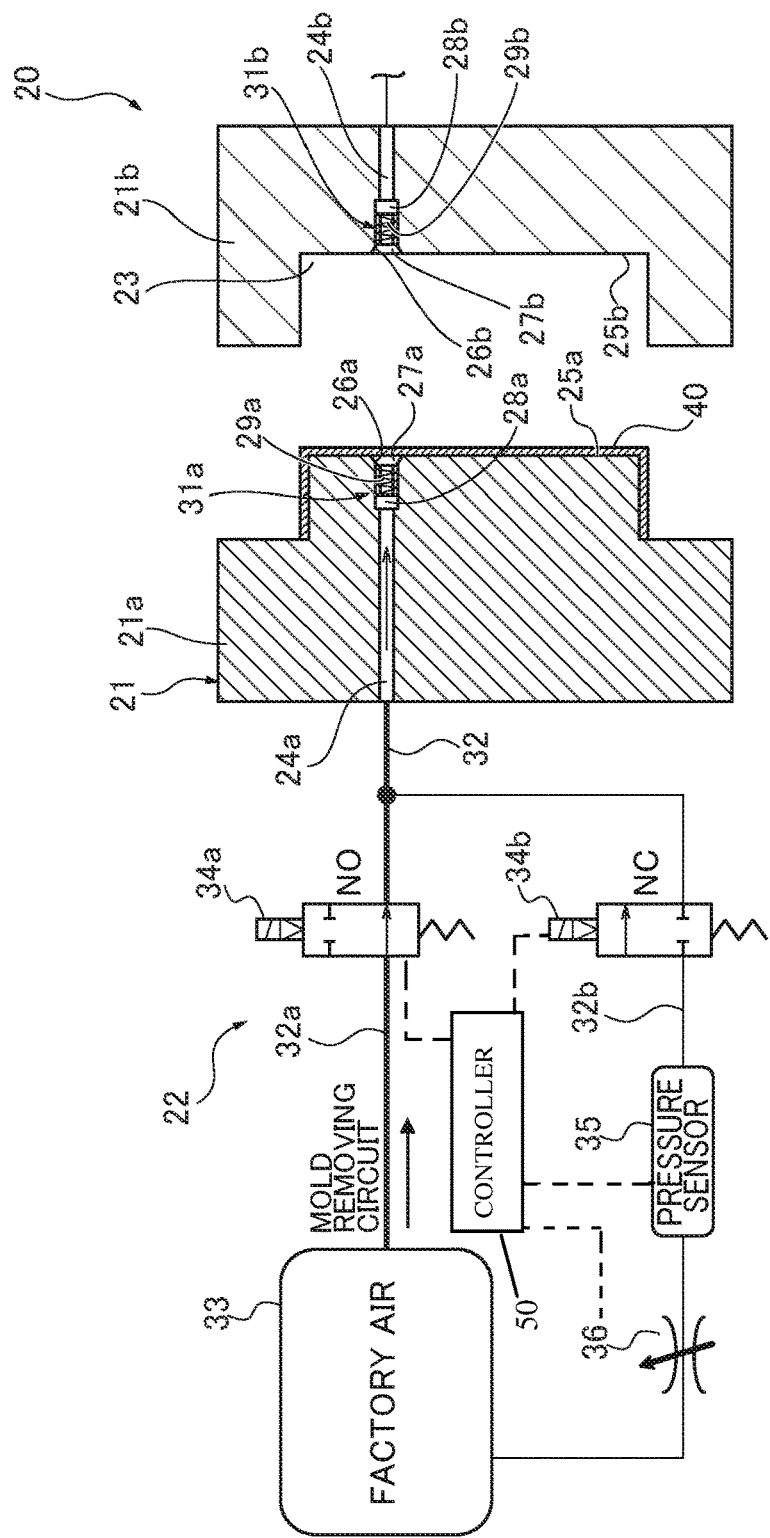
FIG. 2 is a schematic side section view of a resin molding device for thin and soft resin molded products according to a first embodiment before a resin molded product is removed from a convex molding surface.
Figure 3:
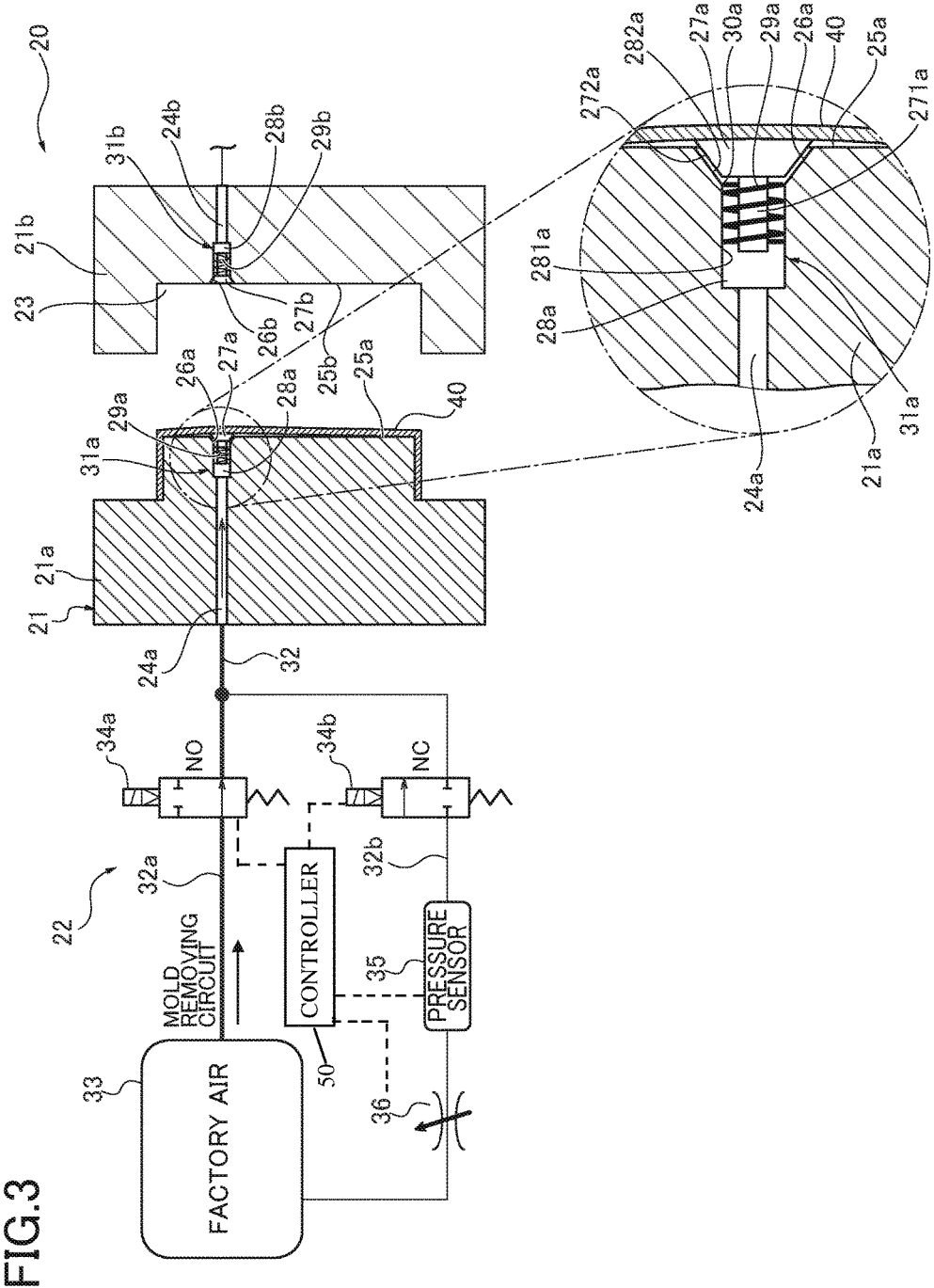
FIG. 3 is a schematic view showing that a first on-off valve of an air ejector is opened to float the resin molded product from the molding surface by air supply in mold removing process.
Figure 4:
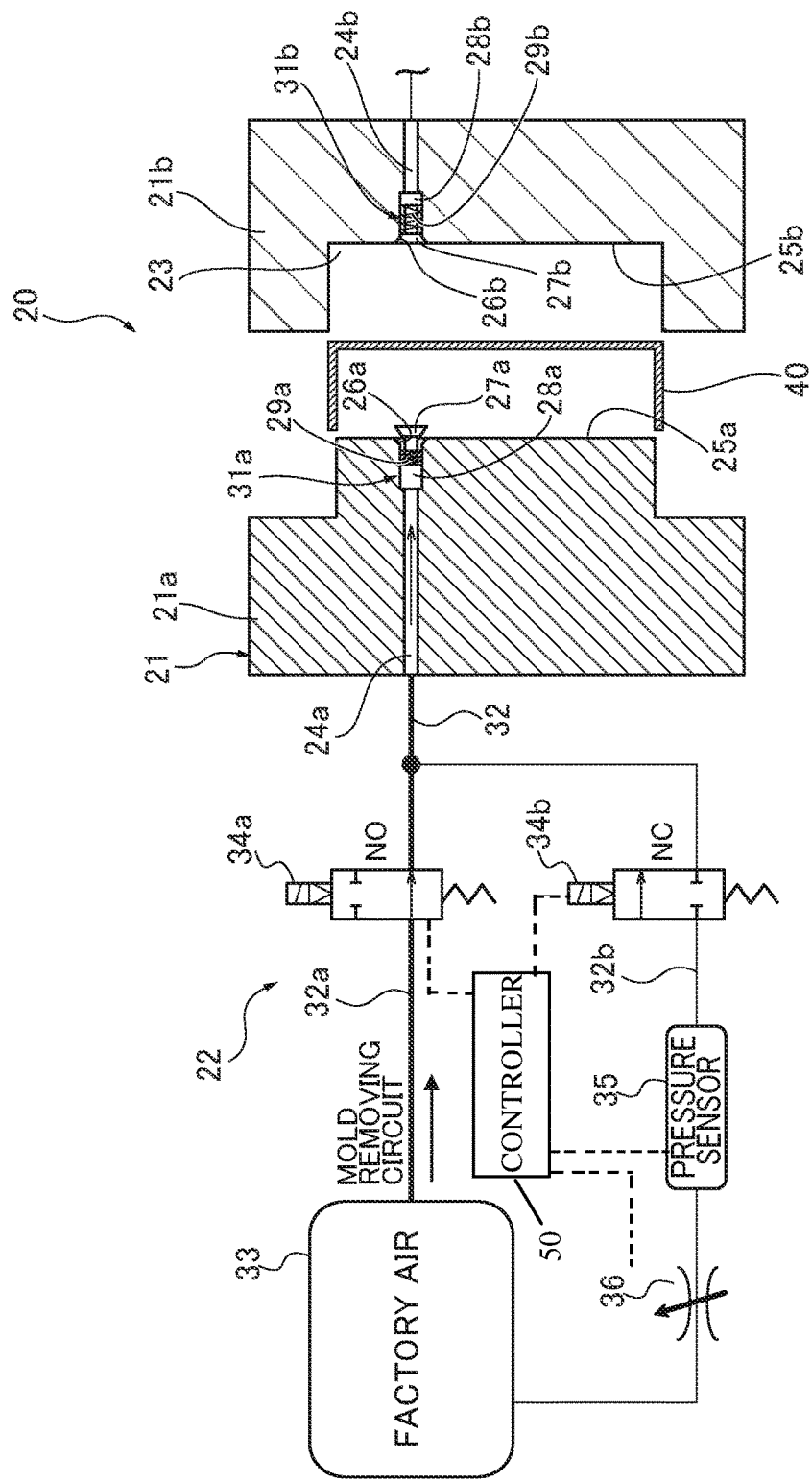
FIG. 4 is a schematic view showing that the separation of the resin molded product from the mold is completed in the mold removing process.
Figure 5:
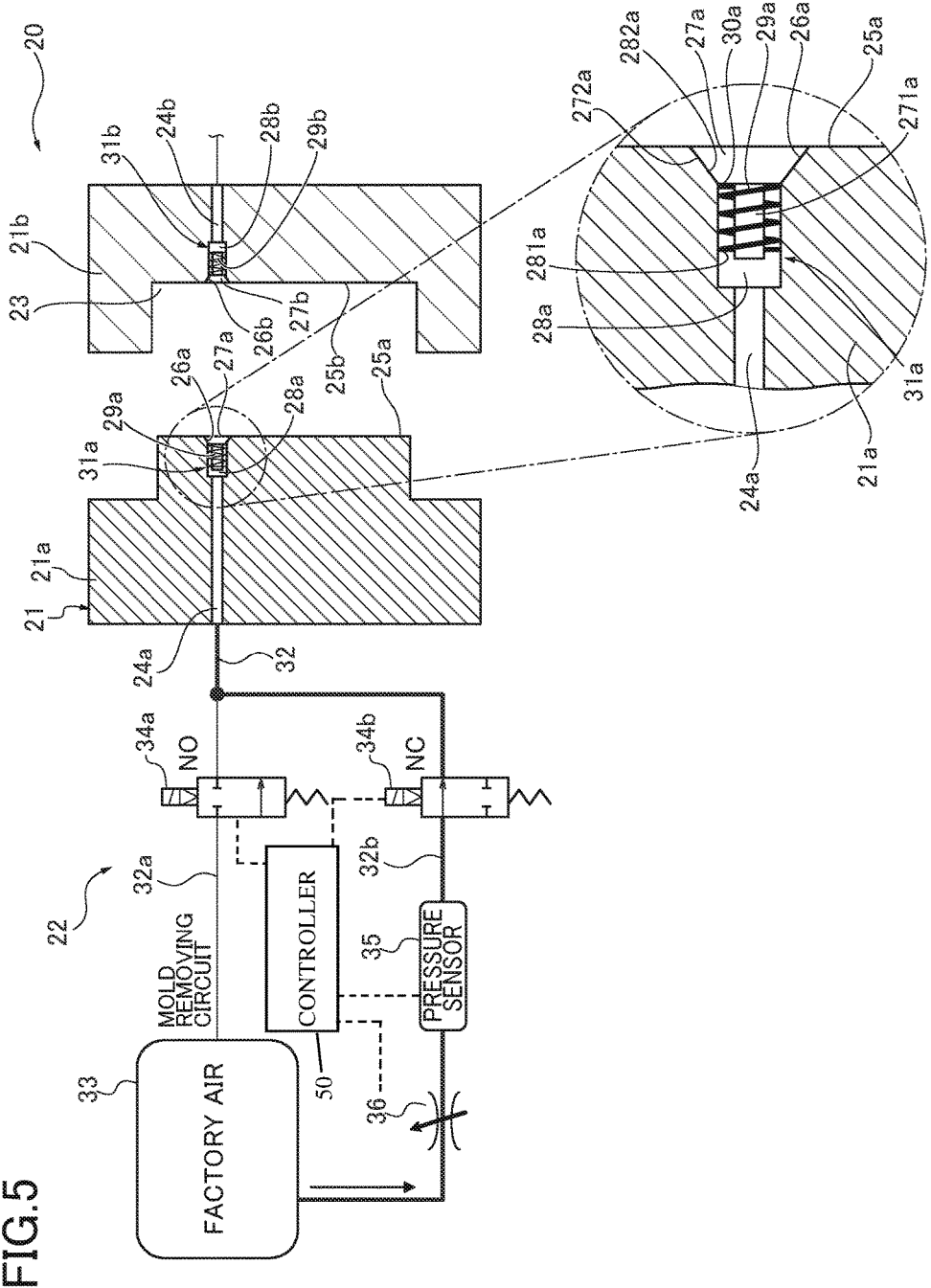
FIG. 5 is a schematic view showing that the first on-off valve is closed and a second on-off valve is opened to supply pressure-reduced air to an air passage and a movable valve is returned to an initial position in operation state detection process.
Figure 6:
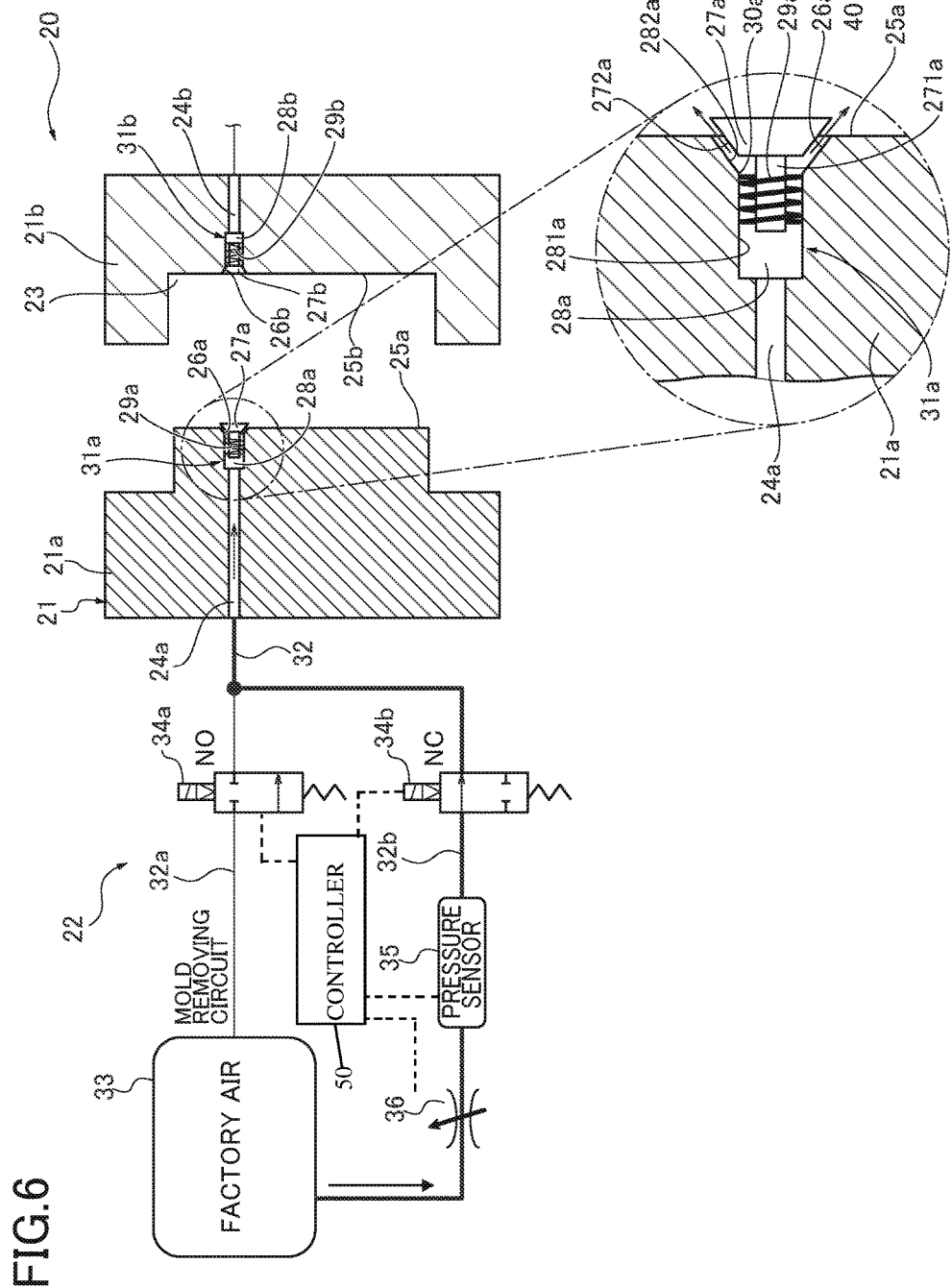
FIG. 6 is a schematic view showing that a returning failure of the movable valve occurs in the operation detection process.

Hereinafter, a first embodiment of the present invention will be described in detail referring to the accompanying drawings. FIG. 1 is a perspective view of an instrument panel made of a soft resin molded product injection-molded with the resin molding device according to the first embodiment. FIG. 2 to FIG. 6 schematically show the resin molding device and method according to the first embodiment. FIG. 2 to FIG. 4 show each step of a process in which a resin molded product is removed from a mold. FIG. 5 and FIG. 6 show steps of an operation state detecting process to determine whether or not there is an operation failure of an air ejector after the mold removal.

FIG. 1 shows one example of an instrument panel 100 installed at the front of a compartment of an automobile or the like. The instrument panel 100 may include a multi-layer structure of which a cushion layer or a foamed layer and a thin and soft surface material are laminated on the surface of a hard core. Further, the instrument panel 100 is about 1.4 m to 2.0 m in width, about 60 cm to 90 cm in height, and about 40 cm to 90 cm in depth in a vehicle front to back direction and it has a complicated shape of a large size (area). Likewise, the surface material for the instrument panel 100 has a complicated shape and a large size. However, in relation to the size, the thickness of the surface material is extremely thin (about 1.0 mm to 2.0 mm) and made from a soft resin material such as a synthetic rubber. Because of this, the surface material is fragile so that the surface material is likely to be creased and curled when removed from the mold. The resin molding device and the resin molding method according to the present embodiment are suitably used for molding such a thin and soft surface material, and the like.

Structure of Resin Molding Device

Referring to FIG. 2, a resin molding device 20 according to the first embodiment comprises a mold 21 including a convex mold portion 21a and a concave mold portion 21b for forming a thin and soft resin molded product 40 by injection molding, an air ejector 22 to peel off the thin and soft resin molded product 40 from a molding surface of the mold 21, and a not-shown molded-product fetching machine to extract the thin and soft resin molded product 40 from the mold 21. With the convex mold 21a and the concave mold 21b closed, a molding space 23 in which the thin and soft resin molded product 40 is molded is formed inside the mold. In general, the convex mold portion is movable and the concave mold portion is secured. After injection molding of a resin molded product, the movable convex mold portion is moved to open the back side of the product and the surface of the product is peeled off from the molding surface of the secured concave mold portion, thereby removing the product from the mold. However, the present invention should not be limited to the above. According to the present embodiment, the concave mold portion 21b is movable, and it is moved to open the front side of the product and then the back face of the product is separated from the secured convex mold portion 21a, as shown in FIG. 2.

The molding space 23 is formed between the convex mold portion 21a and concave mold portion 21b when clamped. According to the present embodiment, to form the thin and soft resin molded product 40 in a thickness of about 1.0 mm to 2.0 mm, the molding space 23 is also an extremely narrow gap of about 1.0 mm to 2.0 mm. A melted resin with a very high fluidity is used as a resin material in order to be spread into every corner of the molding space 23.

The air ejector 22 comprises air passages 24a, 24b formed in the convex mold 21a and concave mold 21b, ejector bodies 31a, 31b to inject air from the air passages 24a, 24b, an air supply path 32 through which air is supplied to the air passages 24a, 24b, and an air supply source 33 to supply factory air to the air supply path 32. The ejector bodies 31a, 31b include air outlets 26a, 26b opening to the molding surfaces 25a, 25b of the convex mold 21a, and concave mold 21b, movable valves 27a, 27b to open/close the air outlets 26a, 26b, bias members 29a, 29b to bias the movable valves 27a, 27b, and accommodation spaces 28a, 28b for the movable valves 27a, 27b, respectively, as shown in FIG. 2 to FIG. 7.

Referring to FIG. 3, the structure of the elements of the ejector body 31a of the convex mold 21a is described. In the convex mold 21a, the accommodation space 28a containing the movable valve 27a is provided in the air passage 24a on the air outlet 26a side. The movable valve 27a is contained in the accommodation space 28a movably from the air outlet 26a to the molding space 23 and normally biased by the bias member 29a to be inside the accommodation space 28a. The movable valve 27a includes a columnar shaft 271a connected to the bias member 29a and a conical valve 272a gradually expanding in diameter towards the molding space 23. The accommodation space 28a includes a columnar space 281a in a slightly larger diameter than that of the shaft 271a, and a conical space 282a in the same shape and size as the valve 272a. The inner wall of the conical space 282a is a valve seat 30a for the valve 272a.

Biased by the bias member 29a, the valve 272a of the movable valve 27a is set on the valve seat 30a to air-tightly close the air outlet 26a and the surface of the valve 272a and the molding surfaces 25a, 25b are flush to each other. Thus, melted resin is prevented from entering there during injection molding. Further, the bias member 29a can be a pressing spring (pressing elastic member, compression spring) or a pulling spring (returning elastic member) as long as it can bias the movable valve 27a to be accommodated. One end of the bias member 29 on the air outlet 26a side is secured in the accommodation space 28a while the other end is secured on the shaft 271a on the air passage 24a side, to bias the movable valve 27a to the inside of the accommodation space 28a by a compressed restoring force, as shown in the enlarged view of FIG. 3. The air pressure moves the movable valve 27a to protrude from the air outlet 26a, and the other end of the bias member secured on the shaft 271a moves therealong. Thereby, the bias member is further compressed. When the air pressure is released, the compressed bias member 29a is restored (extended) to return to the initial position inside the accommodation space 28a.

The basic structure of the concave mold 21b of the ejector body 31b is the same as that of the convex mold 21a of the ejector body 31a so that each element of the convex mold 21a can be read as that of concave mold 21b (numeral code ending a is read as b) and a description thereof will be omitted.

The air outlets 26a, 26b of the respective ejector bodies 31a, 31b of the convex mold 21a and concave mold 21b are disposed to correspond to portions cut from the thin and soft resin molded product 40 in post-process such as the outer circumference or openings of a product such as the instrument panel 100. This tends to avoid leaving traces of the air outlets 26a, 26b or movable valves 27a, 27b on the product and enhance the finish of the product. Although the drawings related to the first embodiment show only one set of the ejector bodies 31a, 31b, the number and positions of ejector bodies can be arbitrarily changed in accordance with the size and thickness of a product. For example, two or more sets can be provided horizontally (in width direction) or vertically (in height direction) as described later in second and third embodiments.

The air passages 24a, 24b are supplied with factory air from the air supply source 33 via the air supply path 32. The air supply path 32 comprises a first air supply path section 32a through which air for removing the mold is supplied, and a second air supply path section 32b through which air for detecting errors is supplied. The first and second air supply path sections 32a, 32b are provided in parallel to the air supply source 33 and include a first on-off valve 34a and a second on-off valve 34b to control the opening and closing of the first and second air supply path sections 32a, 32b. Also, the second air supply path section 32b includes a pressure sensor 35 as an air pressure detector and a pressure reducing valve 36 between the pressure sensor 35 and the air supply source 33 to reduce the pressure of the factory air for supply. Thus, the air with a smaller (less) pressure than the factory air is supplied from the second air supply path section 32b. According to the present embodiment, two kinds of air with different pressures are used to separately supply the air to the first and second air supply path sections 32a, 32b. However, the present invention should not be limited thereto. Two kinds of air can be supplied from a single supply path, to reduce the number of parts and elements as pipes or sensors. Meanwhile, according to the present embodiment, air with different pressures can be efficiently supplied by the two first and second air supply path sections 32a, 32b.

An air supply circuit for the first and second on-off valves 34a, 34b, the pressure sensor 35, and pressure reducing valve 36, an instrument for opening and closing the mold, a molded-product fetching machine, and other operation elements are connected to a control circuit (CPU and the like) of the resin molding device 20 and their operations are controlled by a computer (controller 50).

Moreover, the bias force of the bias members 29a, 29b to the movable valves 27a, 27b are adjusted to be smaller than the air pressure of the factory air from the first air supply path section 32a and larger than the reduced air pressure from the second air supply path section 32b. Thereby, supplied with the factory air from the first air supply path section 32a, the movable valves 27a, 27b are moved against the bias force of the bias members 29a, 29b to open the air outlets 26a, 26b. Meanwhile, supplied with the reduced air from the second air supply path section 32b, the movable valves 27a, 27b are not moved to protrude from the accommodation spaces 28a, 28b since the bias force of the bias members 29a, 29b is larger than the supplied air. Thus, the air outlets 26a, 26b remain closed. As described above, the thickness of the surface material of the instrument panel 100 is about 1.0 mm to 2.0 mm. Taking this into account, the length of the protrusion of the movable valve 27a, 27b from the accommodation spaces 28a, 28b is preferably set to 0.5 mm to 2.0 mm. According to the present embodiment, the dimensions of the movable valves 27a, 27b and bias members 29b, 29b and the bias force of the bias members are set such that the movable valve 27a, 27b are protruded from the accommodation spaces 28a, 28b by the factory air at maximum of about 2.0 mm.

Resin Molding Method

A resin molding method for the thin and soft resin molded product 40 using the above resin molding device 20 is now described. The resin molding method according to the present embodiment includes a molding process in which the thin and soft resin molded product 40 is injection-molded, a mold removing process in which the thin and soft resin molded product 40 is removed from the mold by the air ejector 22, and an operation state detecting process in which the operation state of the air ejector 22 is detected to determine whether or not to continue the process. These processes are repeated from the start to the end of a manufacturing line of the instrument panel 100, that is, when the molding of one thin and soft resin molded product 40 is completed, the processes are resumed for a next thin and soft resin molded product 40.

Molding Process

In the molding process, first, the first and second on-off valves 34a, 34b are closed to stop the air supply to the air passage 24a, 24b. During the stop of air supply, the movable valves 27a, 27b of the air ejector 22 provided in the convex mold 21a and concave mold 21b are accommodated in the accommodation spaces 28a, 28b by the bias force of the members 29a, 29b to close the air outlets 26a, 26b. In this state, the convex mold 21a and concave mold 21b are clamped. Then, melted resin is injected into the molding space 23 between the convex mold 21a and concave mold 21b and solidified. Thus, the thin and soft resin molded product 40 is injection-molded. Herein, the injection and solidification of melted resin are not described and shown in the drawings, but can be achieved by a known method.

Mold Removing Process

In the mold removing process of the present embodiment, first, the concave mold 21b is opened from the thin and soft resin molded product 40 with the air ejector 22 (ejector body 31b). Next, the thin and soft resin molded product 40 is removed from the convex mold 21a with the air ejector (ejector body 31a) and the molded-product fetching machine (not shown). The steps of removing the thin and soft resin molded product 40 from the concave mold 21b and convex mold 21a by the air ejector are almost the same. Herein, the removal of the thin and soft resin molded product 40 from the convex mold 21a is described, referring to FIG. 2 to FIG. 4.

Before the removal of the mold, the thin and soft resin molded product 40 is tightly attached in a vacuum state on the molding surface 25b of the convex mold 21a, as shown in FIG. 2 and it is also higher in temperature than normal temperatures and extremely soft. Then, the first on-off valve 34a is opened to supply the factory air (hereinafter, referred to as mold removing air) to the first air supply path section 32a from the air supply source 33. The mold removing air having passed through the first air supply path section 32a flows into the air passage 24a of the convex mold 21a and presses the movable valve 27a in the accommodation space 28a against the bias force of the bias member 29a to protrude to the molding space 23.

By the pressing force from the mold removing air, the tip end of the movable valve 27 presses the surface of the thin and soft resin molded product 40 to protrude from the air outlet 26a to the molding space 23, as shown in FIG. 3. Due to the property of the thin and soft resin molded product 40, the surface of the thin and soft resin molded product 40 is elastically deformed by the pressing force of the movable valve 27a, thereby allowing the movable valve 27a to protrude so as to open the air outlet 26a and inject the air. A part of the thin and soft resin molded product 40 is floated from the molding surface 25a by the injected air pressure and the pressing force of the movable valve 27a to form a gap, as shown in the partially enlarged view of FIG. 3. By injecting the mold removing air to the gap, the vacuum state of the thin and soft resin molded product 40 and the molding surface 25a is gradually released. Concurrently with the injection of the mold removing air, a chucking tab (not shown) of the air supply source 33, which is formed to protrude by injection molding, is held and pulled with a grip member of the molded-product fetching machine (not shown) to be separated from the molding surface 25a. By such an operation, the thin and soft resin molded product 40 can be peeled off from the molding surface 25a, as shown in FIG. 4.

The protrusion amount of the movable valve 27a is adjusted to be 2.0 mm maximally. Because of this, the thin and soft resin molded product 40 is prevented from being extended by the pressure to become non-restorable. This makes it possible to obtain a high-quality thin and soft resin molded product 40 free from creases, distortions, and breakages.

Operation State Detecting Process

Next, the operation state detecting process is described referring to FIGS. 5 and 6. After the mold removing process, the first on-off valve 34a is closed and the second on-off valve 34b is opened, as shown in FIG. 5. Thereby, the air is supplied from the second air supply path 32b to the air passage 24a in place of the mold removing air from the first air supply path 32a. The air from the second air supply path 32b is the factory air reduced in pressure by the operation of the pressure reducing valve 36, and used for detecting non-failure and failure of the operation state of the air ejector 22 (hereinafter, referred to as detecting air) and set to be smaller than the bias force of the bias member 29a, as described above.

When the detecting air smaller than the bias force of the bias member 29a is supplied to the air passage 24a as above, the movable valve 27a protruding into the molding space 23 from the accommodation space 28a is returned by the bias force of the bias member 29a to the initial position in the accommodation space 28a, as shown in FIG. 5. The air outlet 26a is air-tightly closed by the return of the movable valve 27a to the initial position to stop the air injection. Thus, even with the air injection stopped, the detecting air is continuously supplied, gradually increasing the air pressure in the air passage 24a and the second air supply path 32b. The controller 50 can recognize the closing of the air outlet 26a or the normal returning of the movable valve 27a by the pressure sensor 35 detecting the increase in the air pressure. Then, the controller 50 closes the second on-off valve 34b and stops the supply of the detecting air to the air passage 24a.

Thus, when the movable valve 27a is normally returned, the above mold forming and subsequent processes are repeated for a next thin and soft resin molded product 40. With the movable valve 27a returned normally, the movable valves 27a, 27b do not hit the opposing molding surfaces 25b, 25a even when the mold is clamped in the next molding process. Accordingly, the mold 21 can be prevented from being damaged or broken. Moreover, the air outlets 26a, 26b are air-tightly closed with the movable valves 27a, 27b. Therefore, it is possible to properly prevent the melted resin injected into the molding space 23 from entering the air ejector 22 and becoming solidified. Accordingly, the durability of the resin molding device 20 can be improved.

Meanwhile, when the movable valve 27a is not returned to the initial position, air leaks from the air outlet 26a so that the pressure sensor 35 hardly detects an increase in the air pressure. Upon receiving such a detection result from the pressure sensor 35, the controller 50 determines that an error has occurred, stops the operation of the resin molding device 20, and stops a manufacturing line according to circumstances. Then, the error in the air ejector 22 is dealt with by, for example, an operator's manually returning the movable valve 27*a* of the air ejector 22 to the initial position. Further, with a failure of a part of the movable valve 27*a* or the bias member 29*a* found, the part in question is replaced. Thus, after the cause of the error is resolved, the resin molding device 20 and the manufacturing line are operated again to resume the resin molding process. According to the present embodiment, it is possible to accurately detect the occurrence of error from a change in the air pressure and reduce a breakage or a failure of the resin molding device 20 to a minimum as well as to properly prevent a defective product and improve the quality of products.

By use of the pressure sensor 35 as described above, it is possible to detect a minute change in the air pressure and quickly and surely grasp normal or non-normal returning of the movable valve 27*a*. This makes it possible to decrease the moving distance of the movable valve 27*a*, compared with use of a magnet sensor or the like sensing a distance. As a result, the length at which the movable valve 27*a* is protruded can be decreased to 2.0 mm or less, and the extension of the thin and soft resin molded product 40 can be properly prevented, leading to enhancing the quality of products.

According to the first embodiment it is unnecessary to implement facility investment for preparing another air supply source 33 because of the use of the factory air, resulting in implementing the present invention at a low cost. However, the present invention should not be limited thereto, and air other than the factory air can be used. Furthermore, the first embodiment uses the factory air as a supply source for the mold removing air from the first air supply path and the detecting air from the second air supply path. The detecting air is the factory air reduced in pressure with the pressure reducing valve. Also, the present invention should not be limited thereto. Alternatively, air at a pressure smaller than the bias force of the bias member can be separately prepared as the detecting air instead of the one created by reducing the pressure of the factory air.

Second Embodiment

Next, a resin molding device according to a second embodiment is described. The basic structure of the resin molding device according to the second embodiment is the same as that in the first embodiment except for the air ejector. Therefore, a description of the same structure is omitted. Referring to FIG. 7, an air ejector 122 according to the second embodiment is described.

Figure 7A:
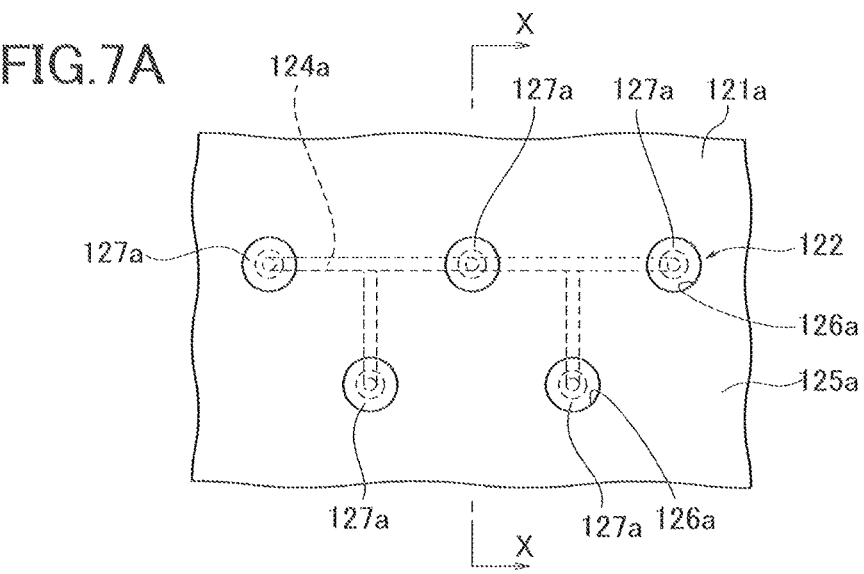
FIG. 7A is a schematic front view of an air outlet of a resin molding device according to a second embodiment.
Figure 7B:
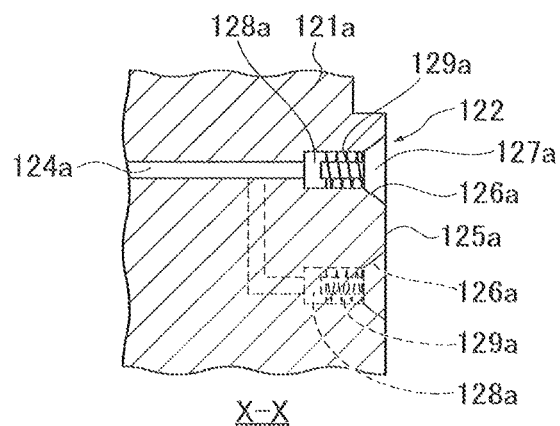
FIG. 7B is a section view of the air outlet in FIG. 7A along an X to X line.

FIG. 7A is a schematic front view of the periphery of air outlets 126*a* on a molding surface 125*a* of a convex mold 121*a*. FIG. 7B is a cross section view of FIG. 7A along an X to X line. As shown in the drawings, in the air ejector 122 an air passage 124*a* is divided into branch paths in horizontal and vertical directions on a molding surface 125*a* side, and the air outlets 126*a* are opened to the molding surface 125*a* side. The air outlets 126*a* are alternately provided in horizontal and vertical directions in FIG. 7A. An accommodation space 128*a* is formed in each branch path on the air outlet 126*a* side, and in the accommodation space a movable valve 127*a* is biased by a bias member 129*a* to close the valve, as shown in FIG. 7B. Each air outlet 126*a* including these elements is preferably formed in a portion as an opening of a product to be removed in post-process.

In the second embodiment, due to the air outlets 126*a* provided in the horizontal and vertical directions, a load of the air and the movable valve 127*a* can be distributed with balance in a large-size, thin and soft resin molded product and the air can be evenly injected to the product for removing the mold. Moreover, although the air passage 124*a* is divided on the air outlet 126*a* side, the air supply path side of the passage is one space. Thus, only one circuit (air supply system) comprising the first and second air supply paths, first and second on-off valves, pressure sensor is needed. Therefore, it is possible to concurrently supply the air to all the air outlets 126*a* and promptly detect an anomaly of any of the movable valves 127*a* with a single pressure sensor. Moreover, a compact resin molding device at a low cost can be realized. Needless to say, the air passage 124*a* does not have to be divided, and a plurality of air passages can be provided in a mold. Further, each air passage can be supplied with air from a single air supply system or an air supply path or a pressure sensor can be included in each passage.

Third Embodiment

Figure 8:
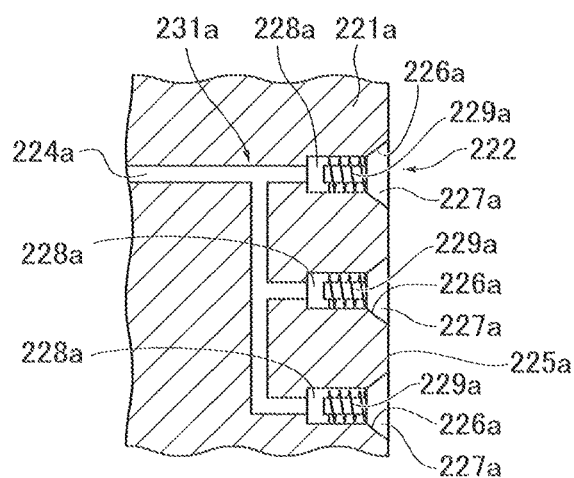
FIG. 8 is a side section view of an air outlet of a resin molding device according to a third embodiment.

Next, a resin molding device according to a third embodiment is described. The basic structure of a resin molding device in the third embodiment is the same as that of the first embodiment except for the air ejector. Therefore, a detailed description thereof is omitted. In the following, an air ejector 222 is described, referring to FIG. 8.

In the second embodiment the air passages 124*a* are split in horizontal and vertical directions and the air outlets 126*a* are formed alternatively in horizontal and vertical directions. Meanwhile, in the third embodiment air passages 224*a* are split in a vertical direction and air outlets 226*a* are formed coaxially in a vertical direction. Alternatively, sets of the passages split in a vertical direction and the air outlets 226*a* are disposed in a horizontal direction. As in the second embodiment, the resin molded product can be appropriately removed from the mold in the third embodiment.

Moreover, as viewed from side in FIG. 1, the instrument panel 100 is a curved shape, has a large surface area, and comprises a top face portion 100*a* facing at least upward, a rear face portion 100*b* facing an occupant side, and a bend portion 100*c* placed between the top face portion 100*a* and the rear face portion 100*b*. Thus, when separated from the mold with a molded-product fetching machine, the thin and soft resin molded product as a surface material may be bent or deflected due to its own weight and else. For the purpose of preventing the operation efficiency of mold removing and the product quality from being affected by such bends or deflection, in a different embodiment a molded-product fetching machine can be provided with a support arm (not shown), although it is still in a development stage. Then, the thin and soft resin molded product is removed from the mold with the air ejector while supported at a vertical middle portion of the back side by the support arm of the molded-product fetching machine. With provision of the support arm, it is possible to suitably remove the thin and soft resin molded product from the mold without a defect of shape such as creases. Thus, removing the thin and soft resin molded product from the mold can be more easily mechanized or automated.

As above, the embodiments of the present invention have been described by way of example, and the present invention should not be limited to such embodiments. The problem to solve by the present invention can be solved by any structure that can easily and precisely sense normalcy or anomaly of the operation state of an air ejector and improve the quality of resin molded products. Further, each of the above embodiments is applied to the resin molding device and method for forming a thin and soft resin molded product. However, it is also applicable to forming a thick and hard resin molded product. In forming a thick and hard resin molded product, good efficient resin molding with excellent error detectability can be realized by monitoring the operation state of the air ejector from a detected air pressure, in comparison with the use of a sensor such as a magnet sensor.

CROSS-REFERENCE TO RELATED APPLICATION

The present application is based on and claims priority from Japanese Patent Application No. 2012-138944, filed on Jun. 20, 2012, the disclosure of which is hereby incorporated by reference in its entirety.

The invention claimed is:

1. A resin molding device comprising:
a controller;
a mold including a molding space in which a resin molded product is to be formed by injection molding, the mold comprising a concave mold portion and a convex mold portion;
an air ejector to remove, by air injection, the resin molded product formed in the molding space from a molding surface of the mold; and
an air supply source for supplying air to the air ejector, wherein the air ejector includes:
an air passage formed inside the mold;
an air outlet at a molding-space side of the air passage to inject air between the resin molded product formed in the molding space and the molding surface of the mold;
a movable valve movably accommodated inside the air passage;
a bias member configured to bias the movable valve in a closing direction so as to close the air outlet;
an air supply path through which the air is supplied from the air supply source to the air passage;
an air pressure detector on the air supply path and configured to detect a pressure of the air; and
a pressure reducing valve on the air supply path and configured to reduce an air pressure of the air supplied from the air supply source to the air passage,
wherein the controller is configured to:
when the resin molded product is being removed from the molding space, control the air ejector to supply the air from the air supply source to the air passage via the air supply path at an ejection air pressure larger than a bias force of the bias member so as to move the movable valve so that the movable valve protrudes from the air outlet and thereby opens the air outlet to remove the resin molded product from the molding space; and
after the resin molded product has been removed from the molding space, control the air ejector to supply the air from the air supply source to the air passage via the air supply path at a detecting air pressure which is reduced by the pressure reducing valve to be smaller than the bias force of the bias member but larger than zero, and to compare the detecting air pressure and an actual air pressure detected by the air pressure detector to determine the presence of a defect in the movable valve or an abnormality in the operation of the movable valve,
wherein the air supply path includes a first air supply path section and a second air supply path section disposed in parallel to each other and both arranged between the air supply source and the air passage, a first on-off valve on the first air supply path section, and a second on-off valve on the second air supply path section,
wherein the air pressure detector is on the second air supply path section, and
wherein the controller is further configured to:
when the resin molded product is being removed from the molding space, control the air ejector to open the first on-off valve and close the second on-off valve so as to supply the air to the air passage via the first air supply path section at the ejection air pressure larger than the bias force of the bias member, and
after the resin molded product has been removed from the molding space, control the air ejector to close the first on-off valve and open the second on-off valve so as to supply the air to the air passage via the second air supply path section at the detecting air pressure which is reduced by the pressure reducing valve to be smaller than the bias force of the bias member.

2. The resin molding device according to claim 1, wherein the movable valve is configured to protrude from the air outlet at a length of 0.5 mm to 2.0 mm.

3. The resin molding device according to claim 1,
wherein the air outlet is a first air outlet of a plurality of air outlets of the air ejector, the movable valve is a first movable valve of a plurality of movable valves of the air ejector, and the bias member is a first bias member of a plurality of bias members of the air ejector,
wherein the air passage includes a plurality of branch paths split towards the molding space, and
wherein each of the branch paths includes a respective one of the air outlets, a respective one of the movable valves, and a respective one of the bias members.

* * * * *